(No Model.)
J., D. A. & J. W. BARNHART.
MILK COOLER.
No. 592,721. Patented Oct. 26, 1897.
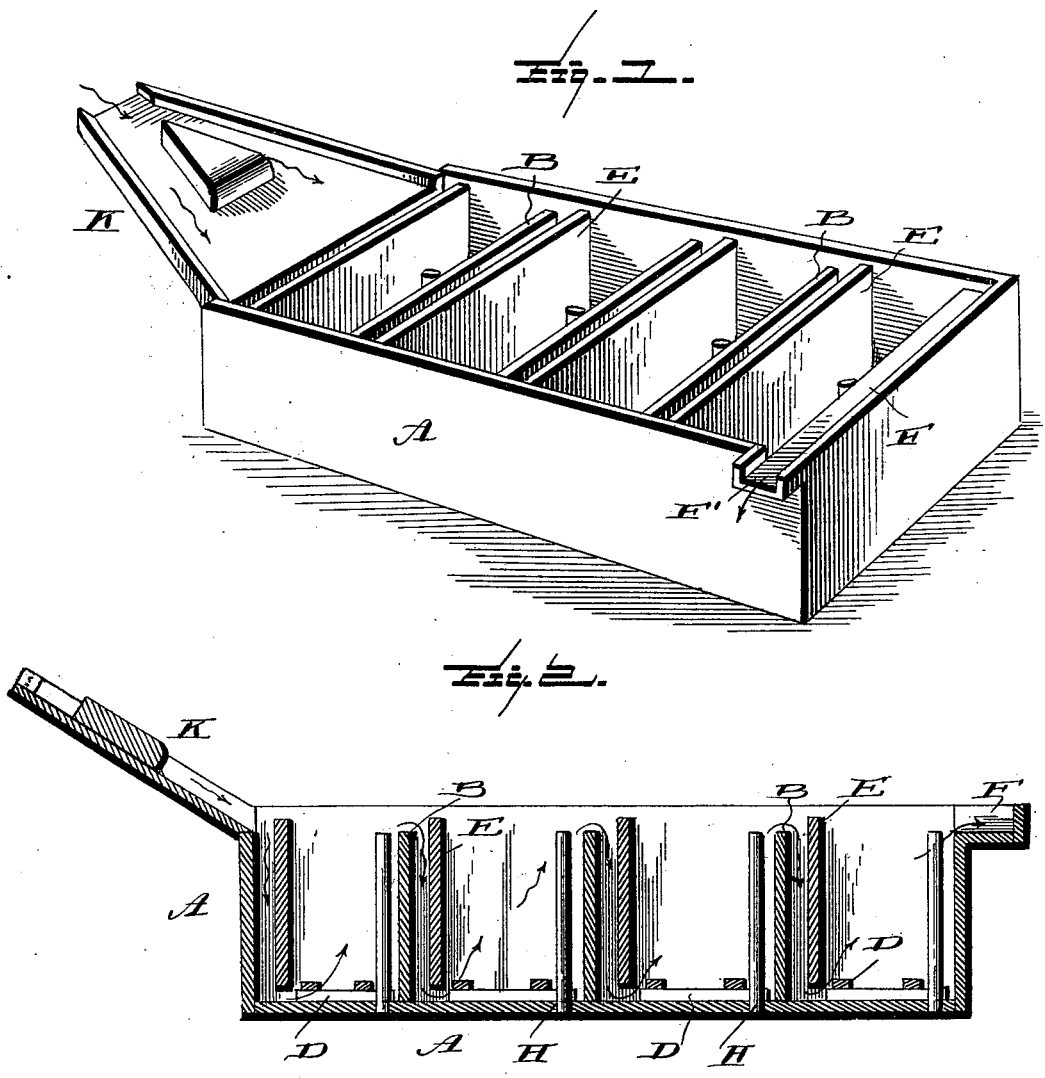

UNITED STATES PATENT OFFICE.

JOHN BARNHART, DAVID A. BARNHART, AND JAMES W. BARNHART, OF WILLIAMSON, PENNSYLVANIA.

MILK-COOLER.

SPECIFICATION forming part of Letters Patent No. 592,721, dated October 26, 1897.

Application filed April 27, 1897. Serial No. 634,147. (No model.)

*To all whom it may concern:*

Be it known that we, JOHN BARNHART, DAVID A. BARNHART, and JAMES W. BARNHART, citizens of the United States, residing at Williamson, in the county of Franklin and State of Pennsylvania, have invented certain new and useful Improvements in Milk-Coolers; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in coolers, and especially to a milk-cooler, by which provision is made to allow a running current of water to pass through a tank having suitable partitions between which the can of milk may be held on suitable racks and so constructed that water which is fed to the tank may pass over and under alternate partitions, so as to take up the heat which is radiated from the milk and to pass out the opposite end of the tank from which it enters, thus supplying a constant current of cold water to the sides and bottoms of the cooling-receptacles.

A further part of the invention consists in the provision of means for separating or spreading the water as it is fed to the tank so that it will enter the same in a sheet of water extending the entire width of the tank.

To these ends and to such others as the invention may pertain the same consists, further, in the novel construction, combination, and adaptation of parts, as will be hereinafter more fully described, and then specifically defined in the appended claim.

The invention is clearly illustrated in the accompanying drawings, which, with the letters of reference marked thereon, form a part of this application, and in which drawings—

Figure 1 is a perspective view of our improved cooler. Fig. 2 is a central longitudinal and vertical section.

Reference being had to the details of the drawings by letter, A designates the tank, which is divided into a series of compartments by means of the partitions B, the upper edges of which partitions extend, preferably, a slight distance below the upper edges of the tank, and each compartment is adapted to hold a can of milk or other liquid which it is desired to cool, these cans being set upon racks D, removably held at the bottom of each compartment. Adjacent to each partition is a second partition-strip E, the upper end of which is in a plane parallel to the planes of the upper edges of the partitions B and slightly above, while spaces are left between their lower edges and the bottom of the tank, so as to allow the water to pass underneath the said partitions E and over the tops of the partitions B. At one end of the tank is a trough F, through which the water passes through an outlet F', which water will pass from one end of the tank through, over, and under the alternate partitions to the outlet, having taken up the heat radiated from the milk or other liquid. At the inlet of the tank is our improved attachment K for dividing or separating the water as it enters the tank. This attachment broadens outward from the inlet-passage, and located in the center portion thereof is a V-shaped dividing-block tapering toward the tank, which is provided for the purpose of separating the stream of water as it comes under to the said attachment, whereby the water is fed into the tank across the entire width of the end thereof.

From the foregoing it will be seen that the water which is being constantly fed into the tank passes under the first partition and fills the first compartment, and after rising above the upper edge of the first partition B is allowed to pass down underneath the next partition E and continue on in a similar course until the outlet is reached, thus causing a circulation of the cold water from end to end of the tank.

Each compartment is provided with an outlet-passage H, by which any sediment or other foreign matter may be removed or the water drawn off from the compartments.

What we claim to be new, and desire to secure by Letters Patent, is—

In a milk-cooler, the combination with the tank, series of transversely-arranged partitions B and E in pairs therein, each alternate partition E having a space intervening between its lower edge, and the bottom of the tank and having their upper edges in the same plane, of the trough F, and outlet F' leading thereform, the upper surface of the said trough being in a plane coincident with the upper edges of said partitions B and below the upper edges of the partitions E, of the downwardly and outwardly inclined inlet passage-way, with dividing-block thereon, the lower end of said passage-way secured to and opening into the end of the tank, slightly beneath the top thereof, as set forth.

In testimony whereof we affix our signatures in presence of two witnesses.

JOHN BARNHART.
    DAVID A. BARNHART.
    JAMES W. BARNHART.

Witnesses:
 CHAS. T. MACLAY,
 ARTHUR N. O'CONNER.